United States Patent
Kim et al.

(10) Patent No.: US 10,846,214 B2
(45) Date of Patent: Nov. 24, 2020

(54) NONVOLATILE MEMORY SYSTEM AND METHOD OF OPERATING THE SAME

(71) Applicant: Samsung Electronics Co., Ltd., Suwon-si (KR)

(72) Inventors: Jung-Hoon Kim, Yongin-si (KR); Young-Sik Lee, Seoul (KR); Kang-Ho Roh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 16/106,496

(22) Filed: Aug. 21, 2018

(65) Prior Publication Data

US 2019/0188128 A1    Jun. 20, 2019

(30) Foreign Application Priority Data

Dec. 18, 2017  (KR) .................. 10-2017-0174083

(51) Int. Cl.

| | |
|---|---|
| *G06F 12/00* | (2006.01) |
| *G06F 13/00* | (2006.01) |
| *G06F 12/02* | (2006.01) |
| *G06F 3/06* | (2006.01) |
| *G06F 12/0866* | (2016.01) |

(52) U.S. Cl.
CPC ........ *G06F 12/0246* (2013.01); *G06F 3/0619* (2013.01); *G06F 3/0655* (2013.01); *G06F 3/0688* (2013.01); *G06F 12/0292* (2013.01); *G06F 12/0866* (2013.01)

(58) Field of Classification Search
CPC ............. G06F 12/0246; G06F 12/0871; G06F 12/0866; G06F 12/10; G06F 12/00; G06F 13/00; G06F 3/06; G06F 3/0655

USPC .................................................. 711/103, 154
See application file for complete search history.

(56) References Cited

U.S. PATENT DOCUMENTS

| | | | |
|---|---|---|---|
| 8,041,878 B2 | 10/2011 | Lee | |
| 8,880,845 B2 * | 11/2014 | Kong | .................. G06F 12/1027 711/206 |
| 9,189,385 B2 | 11/2015 | Cohen et al. | |
| 9,235,346 B2 | 1/2016 | Baryudin et al. | |
| 9,734,057 B2 | 8/2017 | Choi | |
| 2010/0191896 A1 | 7/2010 | Yang et al. | |

(Continued)

FOREIGN PATENT DOCUMENTS

| | | |
|---|---|---|
| JP | 2005-018842 A | 1/2005 |
| JP | 2006-277737 A | 10/2006 |

(Continued)

*Primary Examiner* — Tuan V Thai
(74) *Attorney, Agent, or Firm* — Muir Patent Law, PLLC

(57) ABSTRACT

To operate a nonvolatile memory system including a nonvolatile memory device and a memory controller, a mapping memory is divided into a plurality of mapping memory regions where the mapping memory stores mapping data representing a mapping relation between a logical address of a host device and a physical address of the nonvolatile memory device. Occupation information representing whether the mapping data are stored in each mapping memory region of the plurality of mapping memory regions are provided. Based on the occupation information, user data are stored in a corresponding mapping memory region of the plurality of mapping memory regions in which the mapping data are not stored.

19 Claims, 21 Drawing Sheets

(56) References Cited

U.S. PATENT DOCUMENTS

| | | | |
|---|---|---|---|
| 2010/0199024 A1* | 8/2010 | Jeong | G06F 12/0246 |
| | | | 711/103 |
| 2014/0006681 A1* | 1/2014 | Chen | G06F 12/1027 |
| | | | 711/3 |
| 2014/0156964 A1* | 6/2014 | Choi | G06F 12/0646 |
| | | | 711/171 |
| 2015/0324284 A1* | 11/2015 | Kim | G06F 12/0246 |
| | | | 711/103 |
| 2015/0347026 A1* | 12/2015 | Thomas | G06F 12/0246 |
| | | | 711/103 |
| 2015/0347314 A1 | 12/2015 | Lee | |
| 2016/0179683 A1 | 6/2016 | Chen et al. | |
| 2016/0283387 A1 | 9/2016 | Zhou et al. | |
| 2017/0024326 A1 | 1/2017 | Luo et al. | |
| 2017/0132136 A1 | 5/2017 | Ergan et al. | |
| 2017/0337212 A1* | 11/2017 | Hayasaka | G06F 3/067 |

FOREIGN PATENT DOCUMENTS

| | | |
|---|---|---|
| KR | 10-2004-0082921 A | 9/2004 |
| KR | 10-2006-0047704 A | 5/2006 |
| KR | 10-2007-0088102 A | 8/2007 |
| KR | 10-2014-0072639 A | 6/2014 |
| KR | 10-2015-0138713 A | 12/2015 |

\* cited by examiner

FIG. 5A

| MENTij | PAij | ETC |

FIG. 5B

| MENTij | LAij | PAij | ETC |

FIG. 7

| | SR1 | SR2 | SR3 | SR4 | SR5 | SR6 | SR7 | SR8 | SR9 | SR10 | SR11 | SR12 | SR13 | SR14 | SR15 | SR16 |
|---|---|---|---|---|---|---|---|---|---|---|---|---|---|---|---|---|
| 401a | 1 | 1 | 1 | 1 | 1 | 0 | 0 | 0 | 0 | 0 | 0 | 0 | 0 | 0 | 0 | 0 |
| 401b | 11 | 11 | 11 | 11 | 11 | 00 | 00 | 00 | 00 | 01 | 01 | 01 | 01 | 01 | 01 | 01 |

FIG. 9

| SR1 | SR2 | SR3 | SR4 | SR5 | SR6 | SR7 | SR8 | SR9 | SR10 | SR11 | SR12 | SR13 | SR14 | SR15 | SR16 |
|---|---|---|---|---|---|---|---|---|---|---|---|---|---|---|---|
| 1 | 1 | 1 | 1 | 1 | 1 | 1 | 1 | 1 | 0 | 0 | 0 | 0 | 0 | 0 | 0 |

402a

| SR1 | SR2 | SR3 | SR4 | SR5 | SR6 | SR7 | SR8 | SR9 | SR10 | SR11 | SR12 | SR13 | SR14 | SR15 | SR16 |
|---|---|---|---|---|---|---|---|---|---|---|---|---|---|---|---|
| 11 | 11 | 11 | 11 | 11 | 11 | 11 | 11 | 11 | 00 | 01 | 01 | 01 | 01 | 01 | 01 |

402b

| CENTi | MB | LAi | MRAi OR BRAi | ETC |

NONVOLATILE MEMORY SYSTEM AND METHOD OF OPERATING THE SAME

CROSS-REFERENCE TO RELATED APPLICATION

This U.S. Non-provisional application claims priority under 35 USC § 119 to Korean Patent Application No. 10-2017-0174083, filed on Dec. 18, 2017, in the Korean Intellectual Property Office (KIPO), the disclosure of which is incorporated by reference in its entirety herein.

BACKGROUND

Example embodiments relate generally to semiconductor integrated circuits, and more particularly to a nonvolatile memory system and method of operating the nonvolatile memory system.

Semiconductor memory devices for storing data may be classified into volatile memory devices and nonvolatile memory devices. Volatile memory devices, such as dynamic random access memory (DRAM) devices, are typically configured to store data by charging or discharging capacitors in memory cells, and lose the stored data when power is off. Nonvolatile memory devices, such as flash memory devices, may maintain stored data even though power is off. Volatile memory devices are widely used as main memories of various apparatuses, while nonvolatile memory devices are widely used for storing program codes and/or data in various electronic devices, such as computers, mobile devices, etc. As memory capacity of the nonvolatile memory device increases, size and cost of circuits for controlling the nonvolatile memory device increases. In a memory system, a cache memory is used to read or write according to a command, such as a command that is input from the host. As memory capacity of the memory system increases, a memory capacity of the cache memory and cost of manufacturing the memory system may be increased.

SUMMARY

Some example embodiments may provide a nonvolatile memory system and a method of controlling a nonvolatile memory system capable of efficiently utilizing memory resources in a memory controller configured to control a nonvolatile memory device.

According to example embodiments, a method of operating a nonvolatile memory system including a nonvolatile memory device and a memory controller, includes, dividing a mapping memory into a plurality of mapping memory regions where the mapping memory stores mapping data representing a mapping relation between a logical address received from a host device and a physical address of the nonvolatile memory device, providing occupation information representing whether the mapping data are stored in each mapping memory region of the plurality of mapping memory regions and storing, based on the occupation information, user data in a corresponding mapping memory region of the plurality of mapping memory regions in which the mapping data are not stored.

According to example embodiments, a nonvolatile memory system includes a nonvolatile memory device, a mapping memory, an occupation status manager and a controller. The mapping memory stores mapping data representing a mapping relation between a logical address of a host device and a physical address of the nonvolatile memory device, and the mapping memory is divided into a plurality of mapping memory regions. The occupation status manager provides occupation information representing whether the mapping data are stored in each mapping memory region of the plurality of mapping memory regions. The controller stores, based on the occupation information, user data in a corresponding mapping memory region of the plurality of mapping memory regions in which the mapping data are not stored.

According to example embodiments, a nonvolatile memory system includes a nonvolatile memory device, a mapping memory configured to store mapping data representing a mapping relation between a logical address of a host device and a physical address of the nonvolatile memory device, the mapping memory being divided into a plurality of mapping memory regions, a buffer memory configured to store user data, the buffer memory being physically distinct from the mapping memory and divided into a plurality of buffer regions, an occupation status manager configured to provide occupation information representing whether the mapping data are stored in each mapping memory region of the plurality of mapping memory regions, and a controller configured to store, based on the occupation information, user data in a corresponding mapping memory region of the plurality of mapping memory regions in which the mapping data are not stored.

The nonvolatile memory system and the method of operating the nonvolatile memory system according to example embodiments may enhance performance of the nonvolatile memory system without increase of circuit size by utilizing a portion of a mapping memory as a cache memory.

BRIEF DESCRIPTION OF THE DRAWINGS

Example embodiments of the present disclosure will be more clearly understood from the following detailed description taken in conjunction with the accompanying drawings.

FIGS. 5A and 5B are diagrams illustrating example embodiments of a mapping entry stored in a mapping memory according to example embodiments.

FIG. 7 is a diagram illustrating values stored in an occupation status manager corresponding to the occupation status of FIG. 6 according to example embodiments.

FIG. 9 is a diagram illustrating values stored in an occupation status manager corresponding to the occupation status of FIG. 8 according to example embodiments.

DETAILED DESCRIPTION

Figure 1:
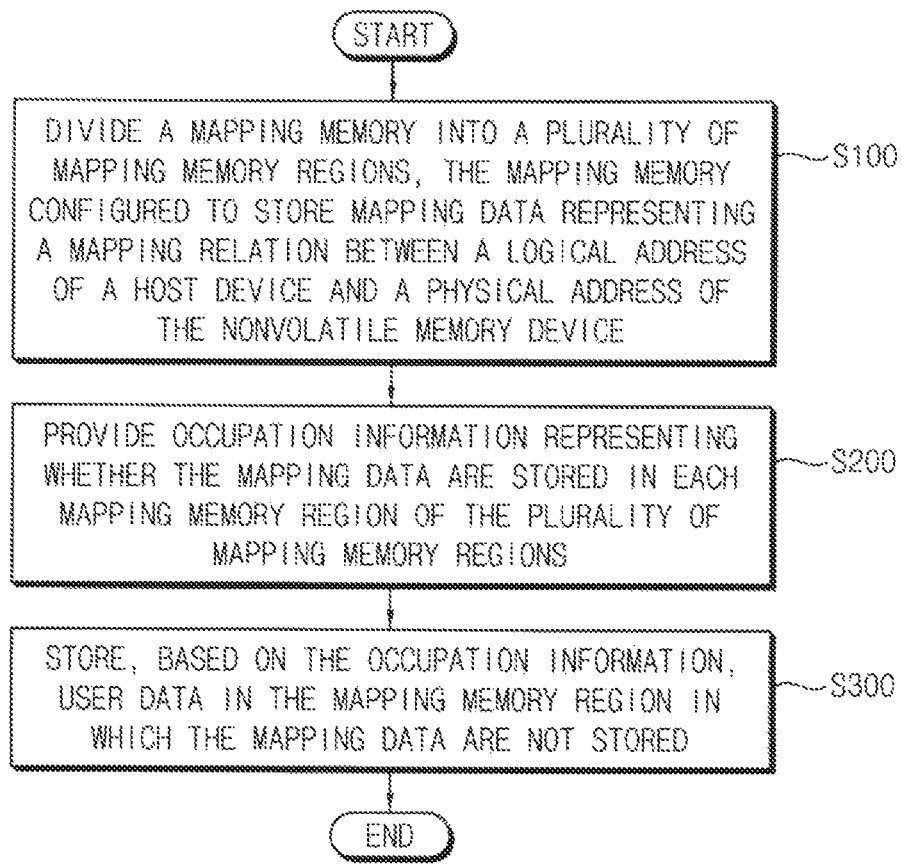
FIG. 1 is a diagram illustrating a method of operating a nonvolatile memory system according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
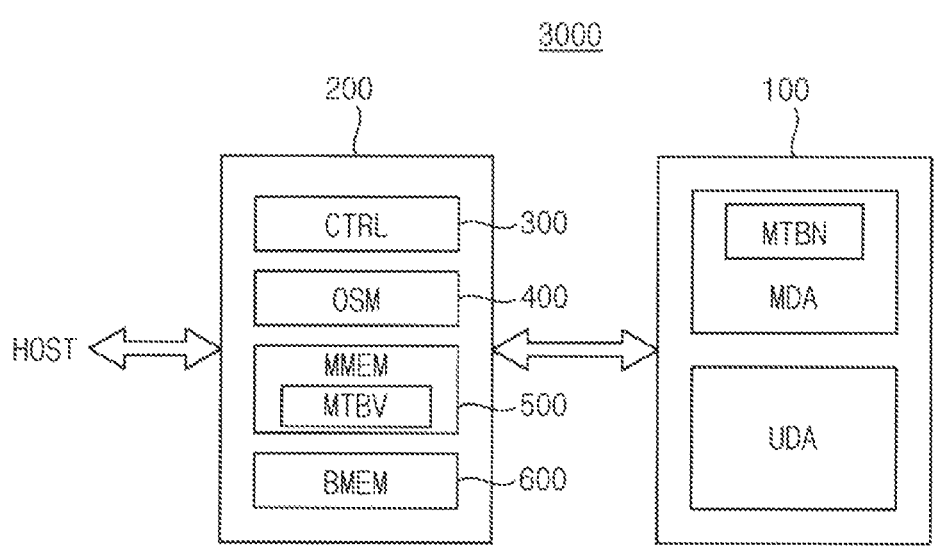
FIG. 2 is a diagram illustrating a nonvolatile memory system according to example embodiments.

FIG. 1 is a diagram illustrating a method of operating a nonvolatile memory system according to example embodiments, and FIG. 2 is a diagram illustrating a nonvolatile memory system according to example embodiments.

Referring to FIG. 1, a mapping memory is divided into a plurality of mapping memory regions, where the mapping memory is configured to store mapping data representing a mapping relation between a logical address of a host device and a physical address of a nonvolatile memory device (S100). The division of the mapping memory will be described below with reference to FIG. 3.

Occupation information representing whether the mapping data are stored in each mapping memory region of the plurality of mapping memory regions are provided (S200). As will be described below with reference to FIGS. 4, 5A, 5B, and 6 through 9, the occupation information may be provided as values stored in status indicating regions in an occupation status manager.

Based on the occupation information, user data are stored in the mapping memory region in which the mapping data are not stored (S300).

Referring to FIG. 2, a nonvolatile memory system 3000 includes a nonvolatile memory device 100 and a memory controller 200 that controls operations of the nonvolatile memory device 100.

A host that communicates with the nonvolatile memory system 3000 may write data to the nonvolatile memory system 3000 or may read data from the nonvolatile memory system 3000. For example, data that is written or read by the host may be defined as user data.

The nonvolatile memory device 100 may include a memory cell array in which a plurality of memory cells are arranged and the memory cell array may include a meta data area MDA and a user data area UDA. Relative sizes of the meta data area MDA and the user data area UDA may be determined variously. Meta data required for controlling the nonvolatile memory device 100 are stored in the meta data area MDA. For example, an initial read voltage level, a program/erase (P/E) cycle, a mapping table MTBN including mapping information between a logical address and a physical address, etc. may be stored in the meta data area MDA. User data may be stored in the user data area UDA.

The memory controller 200 may include a controller CTRL 300, an occupation status manager OSM 400, a mapping memory MMEM 500 and a buffer memory BMEM 600.

The memory controller 200 may include the mapping memory 500 separate from the buffer memory 600 so that the mapping memory 500 and the buffer memory 600 may be simultaneously operated. Thus, an operation speed of the memory system 3000 may be increased.

The mapping memory 500 may store a mapping table MTBV, or mapping data representing a mapping relation between a logical address of a host device and a physical address of the nonvolatile memory device 100. The mapping data may be divided into a plurality of mapping memory regions as will be described below with reference to FIG. 3.

The buffer memory 600 may be physically distinct from the mapping memory 500 and divided into a plurality of buffer regions as will be described below with reference to FIG. 14. According to example embodiments, the buffer memory 600 may be omitted or combined with the mapping memory 500.

In some example embodiments, the buffer memory 600 may load or cache user data that is written or read by the host. For example, the buffer memory 600 may be used as a cache memory.

In some example embodiments, the mapping memory 500 and/or the buffer memory 600 may be implemented with a volatile memory such as a static random access memory (SRAM), a dynamic random access memory (DRAM), etc. In other example embodiments, the mapping memory 500 and/or the buffer memory 600 may be implemented with a nonvolatile memory such as a magnetic random access memory (MRAM), a phase change random access memory (PRAM), etc.

The occupation status manager 400 may provide occupation information that represent whether the mapping data are stored in each mapping memory region of the plurality of mapping memory regions. The controller 300 may store, based on the occupation information from the occupation status manager 400, user data in the plurality of buffer regions or in the mapping memory region in which the mapping data are not stored.

The nonvolatile memory device 100, for example, a flash memory device, may perform data overwriting. To overwrite data in a flash memory device, an erase operation is performed before the data is written, which is referred to as erase-before-write (EBW). An erase operation of the flash memory device takes longer than a write operation. In addition, in the flash memory device, read and write operations are generally performed in units of pages whereas an erase operation is performed in units of blocks that are larger than pages. Due to such characteristics that are different from those of other storage devices, the flash memory device is designed to be compatible with an existing file system. To have compatibility with an existing file system, the memory controller 200 may manage the flash memory device by using a virtual file system such as a flash translation layer (FTL).

The FTL maps a logical address that is input from a host device to a physical address by using a mapping method and generates mapping data including the address mapping information. The mapping data is stored, as the mapping table MTBN, in the memory cell array of the nonvolatile memory device 100.

The logical address is an address for the user data that is recognized by the host device. The host device may write or read the user data by indicating the logical address instead of the physical address that is an address of a space of the nonvolatile memory device 100 in which the user data is actually stored. The memory controller 200 may receive the host command and the logical address for the user data from the host device and may write the user data to the space indicated by the physical address corresponding to the logical address or may read the user data that is stored in the space of the nonvolatile memory device 100 indicated by the physical address.

To enhance the operation speed of the nonvolatile memory system 3000, at least a portion of the mapping data stored in the nonvolatile memory device 100 may be loaded to the mapping memory 500 of the memory controller 200 as the mapping table MTBV. In addition, some of user data may be loaded or cached to the buffer memory 600 of the memory controller 200. As the memory capacity of the nonvolatile memory device 100 increases, the memory capacity of the mapping memory 500 has to be increased. A significant portion of the mapping memory 500 may be unused or unoccupied depending on an amount of valid data stored in the nonvolatile memory device 100.

The nonvolatile memory system 3000 and the method of operating the nonvolatile memory system 3000 according to example embodiments may enhance performance of the nonvolatile memory system without increase of circuit size by utilizing a portion of the mapping memory 500 as a cache memory.

Figure 3:
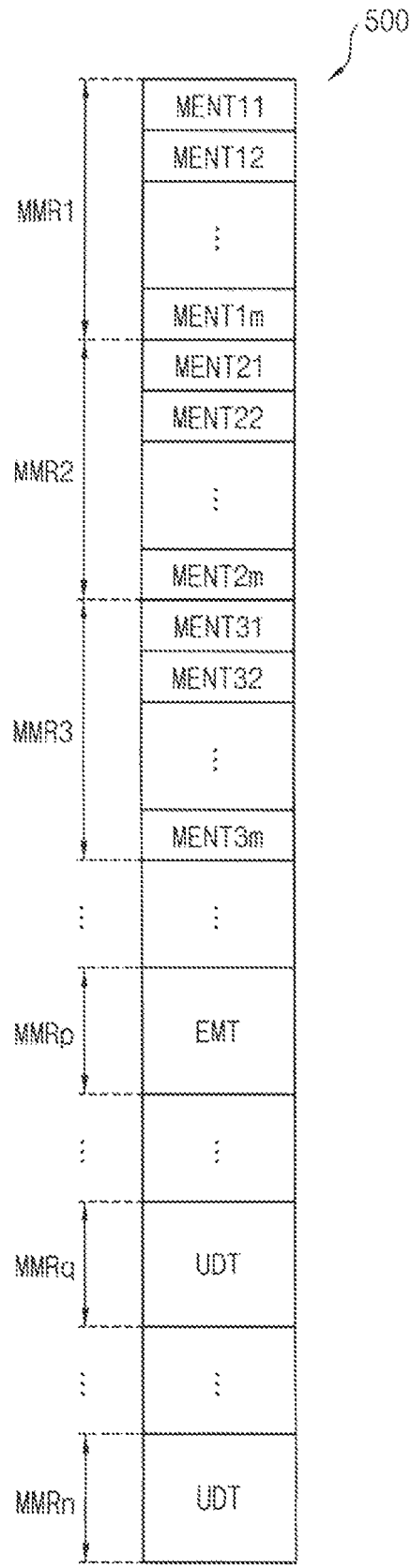
FIG. 3 is a diagram illustrating an example embodiment of dividing a mapping memory included in the nonvolatile memory system of FIG. 2 according to example embodiments.

FIG. 3 is a diagram illustrating an example embodiment of dividing a mapping memory included in the nonvolatile memory system of FIG. 2 according to example embodiments.

Referring to FIG. 3, a mapping memory 500 may be divided into a plurality of mapping memory regions MMR1~MMRn. A size of each of the mapping memory regions MMR1~MMRn may be identical to a size of a data unit that is transferred between the nonvolatile memory device 100 and the memory controller 200. For example, the size of each of the mapping memory regions MMR1~MMRn may be a size of a page that is a data unit of a read operation and a write operation in the nonvolatile memory device 100.

Each of the mapping memory regions MMR1~MMRn may store a plurality of mapping entries. For example, a first mapping memory region MMR1 may store m mapping entries MENT11~MENT1*m*, a second mapping memory region MMR2 may store m mapping entries MENT21~MENT2*m*, a third mapping memory region MMR3 may store m mapping entries MENT31~MENT3*m*, a p-th mapping memory region MMRp may be in an empty state EMP, and q-th through n-th mapping memory regions MMRq~MMRn may store user data UDT according to example embodiments.

For example, the size of each of the mapping memory regions MMR1~MMRn may be 4 KB (kilo-byte) and the size of each mapping entry may be 4 bytes. In this case, about 1000 mapping entries may be stored in each of the mapping memory regions MMR1~MMRn.

Figure 4:
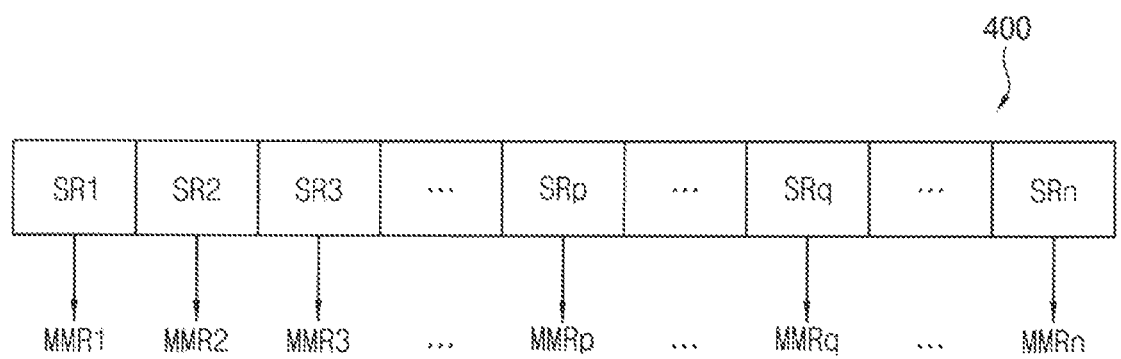
FIG. 4 is a diagram illustrating an example embodiment of an occupation status manager included in the nonvolatile memory system of FIG. 2 according to example embodiments.

FIG. 4 is a diagram illustrating an example embodiment of an occupation status manager included in the nonvolatile memory system of FIG. 2 according to example embodiments.

Referring to FIG. 4, an occupation status manager 400 may include a plurality of status indicating regions SR1~SRn.

The plurality status indicating regions SR1~SRn may correspond to the plurality of mapping memory regions MMR1~MMRn in FIG. 3, respectively. For example, a first status indicating region SR1 corresponds to the first mapping memory region MMR1, a second status indicating region SR2 corresponds to the second mapping memory region MMR2, and in this way an n-th status indicating region SRn corresponds to the n-th mapping memory region MMRn.

Each of the plurality of status indicating regions SR1~SRn stores a value representing whether a corresponding mapping memory region is an occupied mapping memory region in which the mapping data are stored or an unoccupied mapping memory region in which the mapping data are not stored. For example, the value stored in the first status indicating region SR1 represents whether the first mapping memory region MMR1 is the occupied mapping memory region or the unoccupied mapping memory region, the value stored in the second status indicating region SR2 represents whether the second mapping memory region MMR2 is the occupied mapping memory region or the unoccupied mapping memory region, and in this way the value stored in the n-th status indicating region SRn represents whether the n-th mapping memory region MMRn is the occupied mapping memory region or the unoccupied mapping memory region.

As will be described below with reference to FIGS. 7 and 9, each of the status indicating regions SR1~SRn may store one bit or two bits.

FIGS. 5A and 5B are diagrams illustrating example embodiments of a mapping entry stored in a mapping memory according to example embodiments.

Referring to FIG. 5A, each mapping entry MENTij stored in the mapping memory 500 may include a physical address PAij and other values ETC. In this case, the index ij itself of the each mapping entry MENTij may represent the logical address that is mapped to the physical address PAij. The logical address may be calculated using a start address of the mapping table, an offset value corresponding to a size of one mapping entry, etc. The other values ETC may include a value indicating validity of each mapping entry MENTij, a value indicating an erased state of the physical address PAij, etc.

Referring to FIG. 5B, each mapping entry MENTij stored in the mapping memory 500 may include a logical address LAij, a physical address PAij and other values ETC. In this case, the logical address LAij may be mapped to the physical address PAij. The other values ETC may include a value indicating validity of each mapping entry MENTij, a value indicating an erased state of the physical address PAij, etc.

Figure 6:
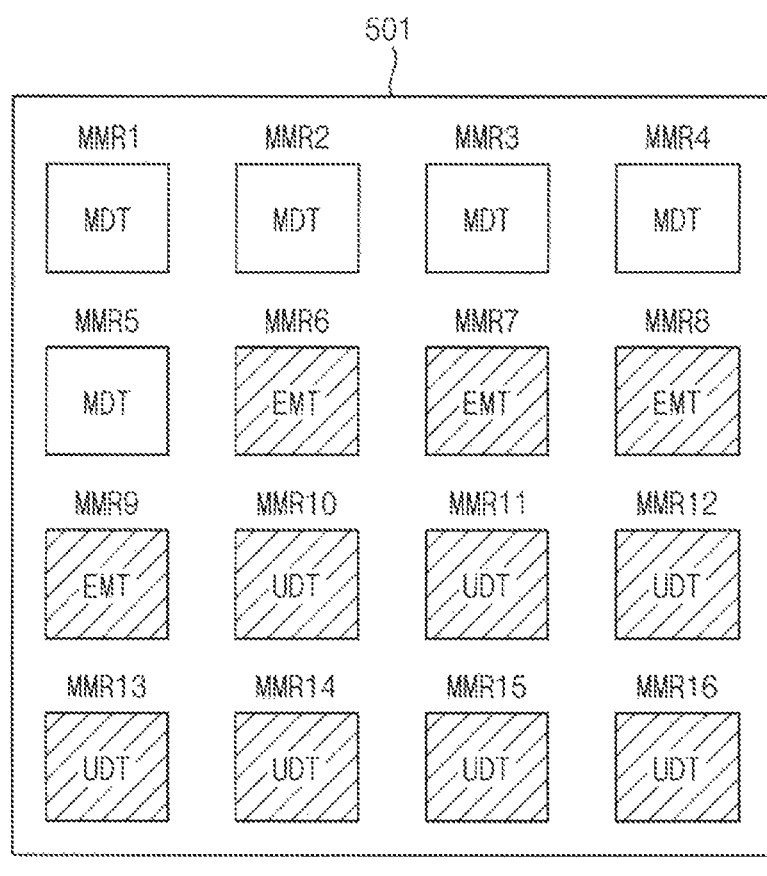
FIG. 6 is a diagram illustrating an example occupation status of a mapping memory according to example embodiments.

FIG. 6 is a diagram illustrating an example occupation status of a mapping memory according to example embodiments, and FIG. 7 is a diagram illustrating values stored in an occupation status manager corresponding to the occupation status of FIG. 6 according to example embodiments.

FIG. 6 illustrates an occupation status 501 of a mapping memory including 16 mapping memory regions MMR1~MMR16. Referring to FIG. 6, first through fifth mapping memory regions MMR1~MMR5 correspond to occupied mapping memory regions OMMR in which the mapping data MDT are stored, and sixth through sixteenth mapping memory regions MMR6~MMR16 correspond to unoccupied mapping memory regions UMMR in which the mapping data MDT are not stored. Among the sixth through sixteenth mapping memory regions MMR6~MMR16 corresponding to the unoccupied mapping memory regions UMMR, the tenth through sixteenth mapping memory regions MMR10~MMR16 correspond to data mapping memory regions DATA MMR in which the user data UDT are stored and the sixth through ninth mapping memory regions MMR6~MMR9 are empty mapping memory regions EMPTY MMR in which both of the mapping data MDT and the user data UDT are not stored.

FIG. 7 illustrates two occupation status managers 401*a* and 401*b* corresponding to the occupation status 501 of the mapping memory of FIG. 6.

The occupation status manager 401*a* according to an example embodiment may store one bit in each of the status indicating regions SR1~SR16. Each of the status indicating regions SR~SR16 may store one of a first value (e.g., "1") and a second value (e.g., "0"), where the first value "1" represents that the corresponding mapping memory region is the occupied mapping memory region OMMR in which the mapping data MDT are stored and the second value "0" represents that the corresponding mapping memory region is the unoccupied mapping memory region UMMR in which the mapping data MDT are not stored. In case of the occupation status 501 of FIG. 6, first through fifth status indicating regions SR1~SR5 may have the first value "1" and sixth through sixteenth status indicating regions SR6~SR16 may have the second value "0" as illustrated in FIG. 7.

The occupation status 501 of the mapping memory is variable and the values of the status indicating regions SR1~SR16 may be updated according to change of the occupation status 501. If the mapping data MDT are newly stored in the unoccupied mapping memory region UMMR, the value of the status indicating region corresponding to the unoccupied mapping memory region UMMR may be changed from the second value "0" to the first value "1". For example, if the mapping data MDT are newly stored in the sixth mapping memory region MMR6, the value of the sixth status indicating region SR6 may be changed from the second value "0" to the first value "1". If the mapping data MDT stored in the occupied mapping memory region OMMR are discarded or invalidated, the value of the status indicating region corresponding to the occupied mapping memory region OMMR may be changed from the first value "1" to the second value "0". For example, the mapping data MDT stored in the fifth mapping memory region MMR5 is discarded, the value of the fifth status indicating region SR5 may be changed from the first value "1" to the second value "0".

The occupation status manager 401*b* according to another example embodiment may store two bits in each of the status indicating regions SR1~SR16. Each of the status indicating regions SR1~SR16 may store one of a first value (e.g., "11"), a second value (e.g., "01") or a third value (e.g., "00"), where the first value "11" may represent that the corresponding mapping memory region is the occupied mapping memory region OMMR in which the mapping data MDT are stored, the second value "01" may represent that the corresponding mapping memory region is the data mapping memory region DATA MMR in which the user data UDT are stored and the third value "00" may represent that the corresponding mapping memory region is the empty mapping memory region EMPTY MMR in which both of the mapping data MDT and the user data UDT are not stored. In case of the occupation status 501 of FIG. 6, first through fifth status indicating regions SR1~SR5 may have the first value "11", tenth through sixteenth status indicating regions SR10~SR16 may have the second value "01" and sixth through ninth status indicating regions SR6~SR9 may have the third value "00" as illustrated in FIG. 7.

If the mapping data MDT are newly stored in the empty mapping memory region EMPTY MMR or in the data mapping memory region DATA MMR, the value of the status indicating region corresponding to the empty mapping memory region EMPTY MMR or the data mapping memory region DATA MMR may be changed from the third value "00" or the second value "01" to the first value "11". For example, if the mapping data MDT are newly stored in the sixth mapping memory region MMR6, the value of the sixth status indicating region SR6 may be changed from the third value "00" to the first value "11". In addition, if the mapping data MDT are newly stored in the tenth mapping memory region MMR10, the value of the tenth status indicating region SR10 may be changed from the second value "01" to the first value "11". If the mapping data MDT stored in the occupied mapping memory region OMMR are discarded or invalidated, the value of the status indicating region corresponding to the occupied mapping memory region OMMR may be changed from the first value "11" to the third value "00". For example, the mapping data MDT stored in the fifth mapping memory region MMR5 is discarded, the value of the fifth status indicating region SR5 may be changed from the first value "11" to the third value "00".

As such, performance of the nonvolatile memory system may be enhanced without increase of circuit size by utilizing a portion of a mapping memory as a cache memory for storing the user data.

Figure 8:
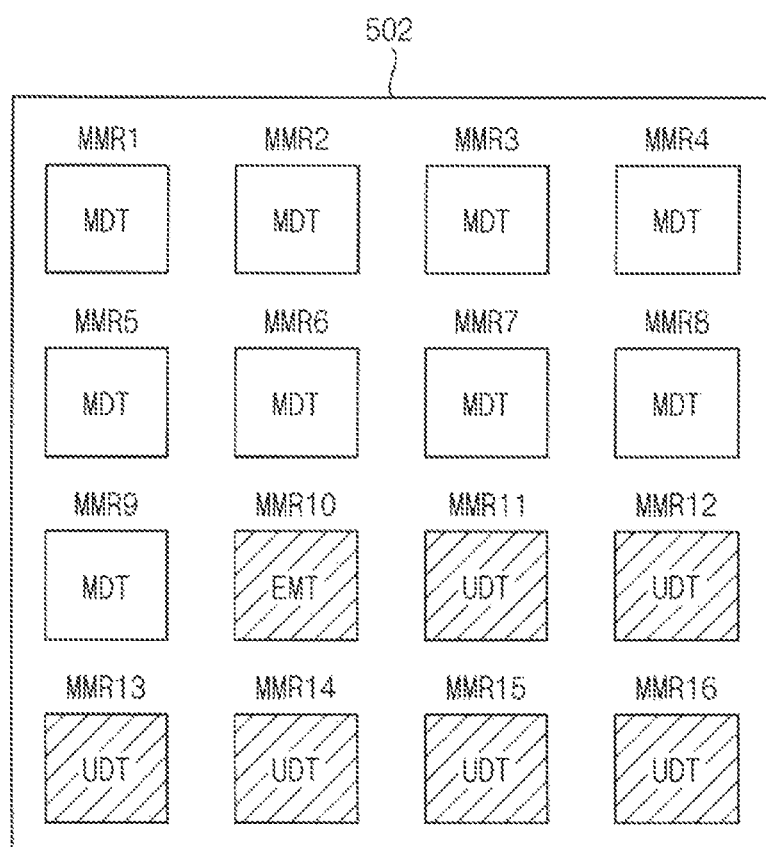
FIG. 8 is a diagram illustrating another example occupation status of a mapping memory according to example embodiments.

FIG. 8 is a diagram illustrating another example occupation status of a mapping memory according to example embodiments, and FIG. 9 is a diagram illustrating values stored in an occupation status manager corresponding to the occupation status of FIG. 8 according to example embodiments.

FIG. 8 illustrates an occupation status 502 of a mapping memory including 16 mapping memory regions MMR1~MMR16. The number of the occupied mapping memory regions OMMR is increased in the occupation status 502 of FIG. 8 in comparison with the occupation status 501 of FIG. 6. Referring to FIG. 8, first through ninth mapping memory regions MMR1~MMR9 correspond to occupied mapping memory regions OMMR in which the mapping data MDT are stored, and tenth through sixteenth mapping memory regions MMR10~MMR16 correspond to unoccupied mapping memory regions UMMR in which the mapping data MDT are not stored. Among the tenth through sixteenth mapping memory regions MMR10~MMR16 corresponding to the unoccupied mapping memory regions UMMR, the eleventh through sixteenth mapping memory regions MMR11~MMR16 correspond to data mapping memory regions DATA MMR in which the user data UDT are stored and the tenth mapping memory region MMR10 is an empty mapping memory region EMPTY MMR in which both of the mapping data MDT and the user data UDT are not stored.

FIG. 9 illustrates two occupation status managers 402a and 402b corresponding to the occupation status 502 of the mapping memory of FIG. 8. The values stored in the status indicating regions SR1~SR16 may be determined and updated as described with reference to FIG. 7.

The occupation status manager 402a according to an example embodiment may store one bit in each of the status indicating regions SR1~SR16. Each of the status indicating regions SR1~SR16 may store one of a first value (e.g., "1") and a second value (e.g., "0"), where the first value "1" may represent that a corresponding mapping memory region is the occupied mapping memory region OMMR in which the mapping data MDT are stored and the second value "0" may represent that a corresponding mapping memory region is the unoccupied mapping memory region UMMR in which the mapping data MDT are not stored. In case of the occupation status 502 of FIG. 8, first through ninth status indicating regions SR1~SR9 may have the first value "1" and tenth through sixteenth status indicating regions SR10~SR16 may have the second value "0" as illustrated in FIG. 9.

The occupation status manager 402b according to another example embodiment may store two bits in each of the status indicating regions SR1~SR16. Each of the status indicating regions SR1~SR16 may store one of a first value (e.g., "11"), a second value (e.g., "01") or a third value (e.g., "00"), where the first value "11" may represent that a corresponding mapping memory region is the occupied mapping memory region OMMR in which the mapping data MDT are stored, the second value "01" represents that a corresponding mapping memory region is the data mapping memory region DATA MMR in which the user data UDT are stored and the third value "00" may represent that the corresponding mapping memory region is the empty mapping memory region EMPTY MMR in which both of the mapping data MDT and the user data UDT are not stored. In case of the occupation status 502 of FIG. 8, first through ninth status indicating regions SR1~SR9 may have the first value "11", eleventh through sixteenth status indicating regions SR11~SR16 may have the second value "01" and a tenth status indicating region SR10 may have the third value "00" as illustrated in FIG. 9.

As described with reference to FIGS. 6 through 9, the number of the occupied mapping memory regions in which the mapping data MDT are stored and the number of the data mapping memory regions DATA MMR in which the user data UDT are stored may be varied dynamically.

Figure 10:
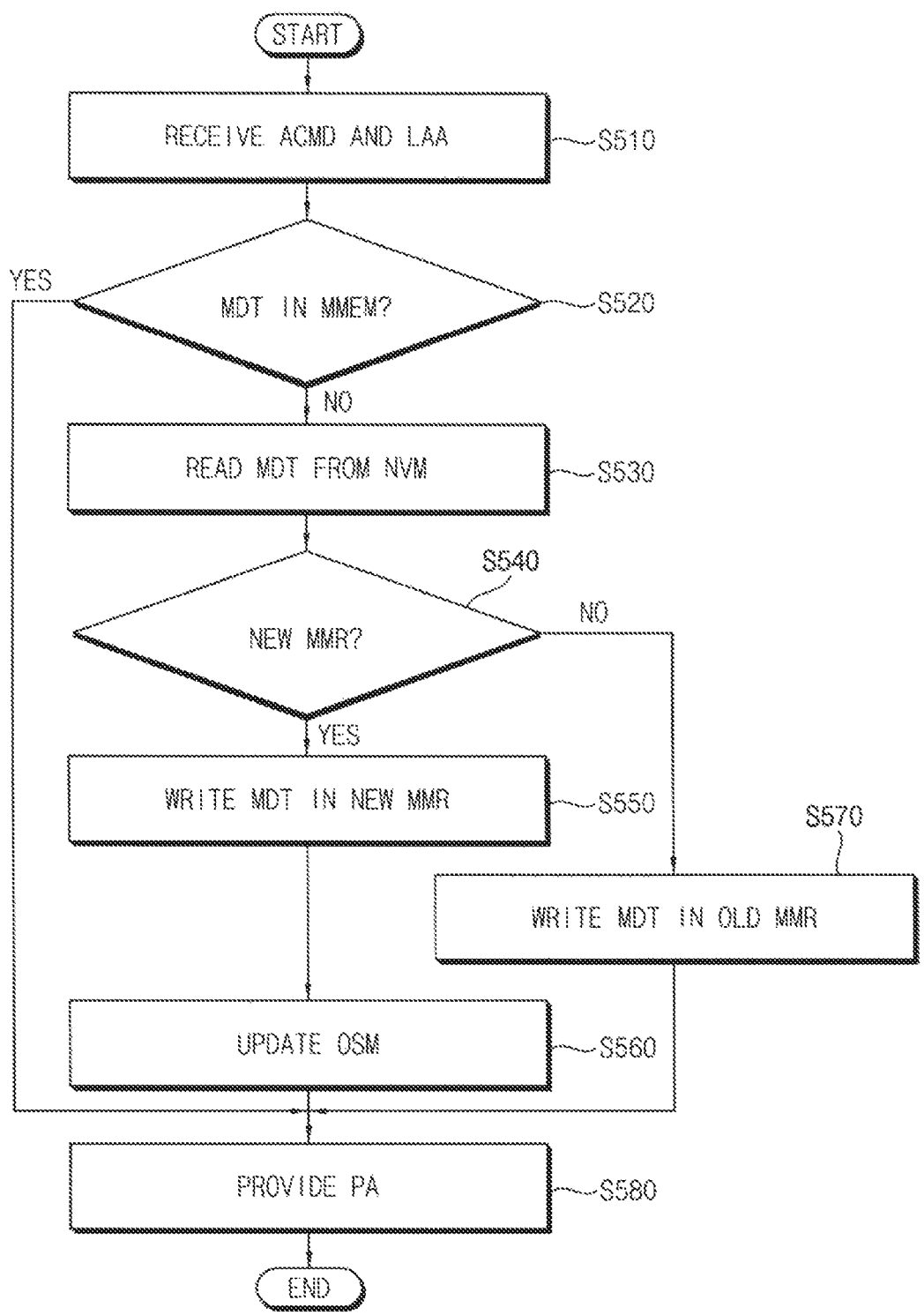
FIG. 10 is a flow chart illustrating a method of operating a nonvolatile memory system according to example embodiments.

FIG. 10 is a flow chart illustrating a method of operating the nonvolatile memory system of FIG. 2 according to example embodiments.

Referring to FIG. 10, for a read operation or a write operation, the memory controller may receive an access command ACMD and a logical access address LAA from a host device (S510). The access command ACMD may include a read command and a write command. The logical access address LAA may include a logical read address and a logical write address.

When the mapping data MDT corresponding to the logical access address LAA are not stored in the occupied mapping memory region of the mapping memory MMEM (S520: NO), the memory controller reads the mapping data MDT corresponding to the logical access address LAA from the nonvolatile memory device (S530).

When the memory controller determines to store the read mapping data MDT in a new mapping memory region NEW MMR corresponding to an unoccupied mapping memory region (S540: YES), the memory controller stores the read mapping data MDT in the new mapping memory region NEW MMR corresponding to the unoccupied mapping memory region UMMR (S550) and updates the value of the corresponding status indicating region of the occupation status manager OSM (S560), as described with reference to FIGS. 6 through 9. The mapping memory provides the physical address PA corresponding to the logical access address LAA (S580) to the nonvolatile memory device. When the memory controller determines to store the read mapping data MDT in an old mapping memory region OLD MMR corresponding to an occupied mapping memory region (S540: NO), the memory controller stores the read mapping data MDT in the old mapping memory region OLD MMR corresponding to the occupied mapping memory region OMMR (S570) and it is not required to update the values of the occupation status manager OSM.

When the mapping data MDT corresponding to the logical access address LAA are stored in the occupied mapping memory region of the mapping memory MMEM (S520: YES), the memory controller does not need to access the nonvolatile memory device and the mapping memory may provide the physical address corresponding to the logical access address LAA to the nonvolatile memory device (S580).

Figure 11:
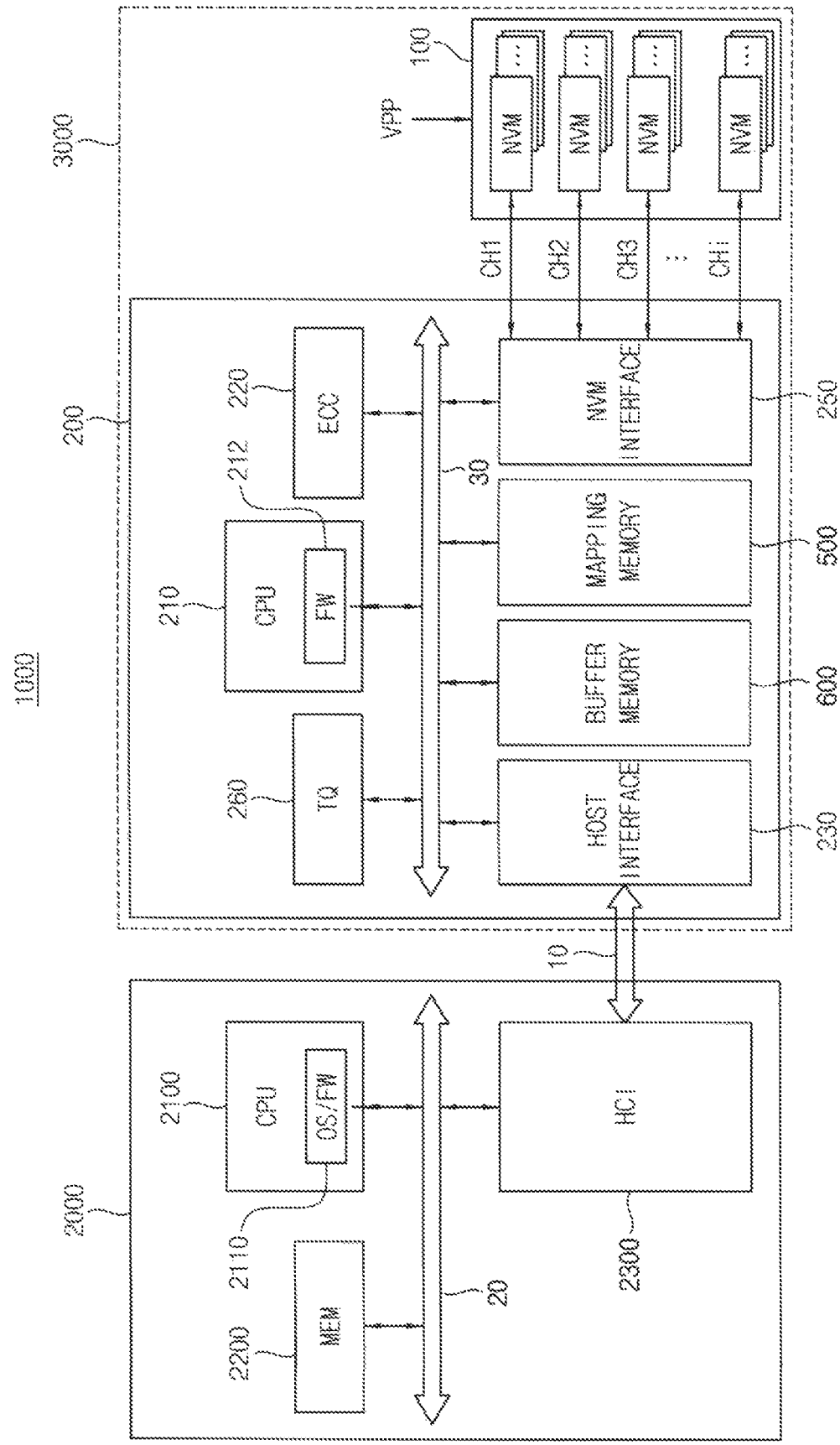
FIG. 11 is a block diagram illustrating a system including a storage device according to example embodiments.

FIG. 11 is a block diagram illustrating a system including a storage device according to example embodiments.

Referring to FIG. 11, a system 1000 includes a host device 2000 and a storage device 3000. The storage device 3000 may be an example of the nonvolatile memory system 3000 of FIG. 2. For example, the storage device 3000 may be an embedded multimedia card (eMMC).

The host device 2000 may be configured to control data processing operations, such as data read operations and data write operations. The host device 2000 may be a data processing device, such as an application processor, which can process data. The host device 2000 and the storage device 3000 may be embedded or implemented in an electronic device. When the system 1000 is an electronic device, the storage device 3000 may be electrically connected with other components of the system 1000 (electronic device) through connection means (e.g., pads, pins, buses, or communication lines) to communicate with the host device 2000.

The host device 2000 may include a processor (CPU) 2100, memory (MEM) 2200 and a host controller interface (HCI) 2300. Operating system (OS) and/or host firmware (FW) 2110 may be driven by the processor 2100. The host device 2000 may also include a clock generator (not shown), a state control unit (not shown), etc.

The processor 2100 may include hardware and/or software for controlling generation of a command CMD, analysis of a response RES, storing of data in a register, e.g., an extended (EXT)_CSD register (not shown), of the storage device 3000, and/or data processing. The processor 2100 may drive the operating system (OS) and/or the host firmware (FW) 2110 to perform these operations.

The host controller interface (HCI) 2300 may interface with the storage device 3000. For example, the host controller interface 2300 is configured to issue the command CMD to the storage device 3000, receive the response RES according to the command CMD from the storage device 3000, transmit write data to the storage device 3000, and receive read data from the storage device 3000.

The storage device 3000 may include a plurality of nonvolatile memory devices (NVM) 100 and a storage controller 200. The nonvolatile memory devices (NVM) 100 may include the nonvolatile memory device 100 of FIG. 2 and the storage controller 200 may be an example of the memory controller 200 of FIG. 2.

The nonvolatile memory devices 100 may be optionally supplied with an external high voltage VPP. The nonvolatile memory devices 100 may be implemented with flash memory, ferroelectric random access memory (FRAM), phase-change random access memory (PRAM), magnetic random access memory (MRAM), etc.

The storage controller 200 may be connected to the nonvolatile memory devices 100 through multiple channels CH1~CHi. The storage controller 200 may include one or more processors 210, an error correction code (ECC) block 220, a host interface 230, a mapping memory 500, a buffer memory 600, a nonvolatile memory interface 250 and a task queue 260.

As described above, the mapping memory 500 is divided into a plurality of mapping memory regions. The mapping memory 500 stores mapping data representing a mapping relation between a logical address of the host device 2000 and a physical address of the nonvolatile memory devices 100. The buffer memory 600 may be physically distinct from the mapping memory and divided into a plurality of buffer regions as will be described with reference to FIG. 14.

The ECC block 220 may calculate error correction code values of data to be programmed at a writing operation, and may correct an error of read data using an error correction code value at a read operation. In a data recovery operation, the ECC block 220 may correct an error of data recovered from the nonvolatile memory devices 100. Although not shown in FIG. 11, a code memory may be further included to store code data needed to drive the storage controller 200. The code memory may be implemented by a nonvolatile memory device.

The processor 210 is configured to control overall operations of the storage controller 200. For example, the processor 210 may operate firmware 212 including a flash translation layer (FTL), etc. The FTL may perform various functions, e.g., address mapping, read calibration, error correction, etc.

The task queue 260 may store tasks (e.g., write tasks and read tasks provided from the host device 2000) and status information of the respective tasks. The host interface 230 may provide an interface with external devices such as the host device 2000. The nonvolatile memory interface 250 may provide an interface with the nonvolatile memory devices 100.

Figure 12:
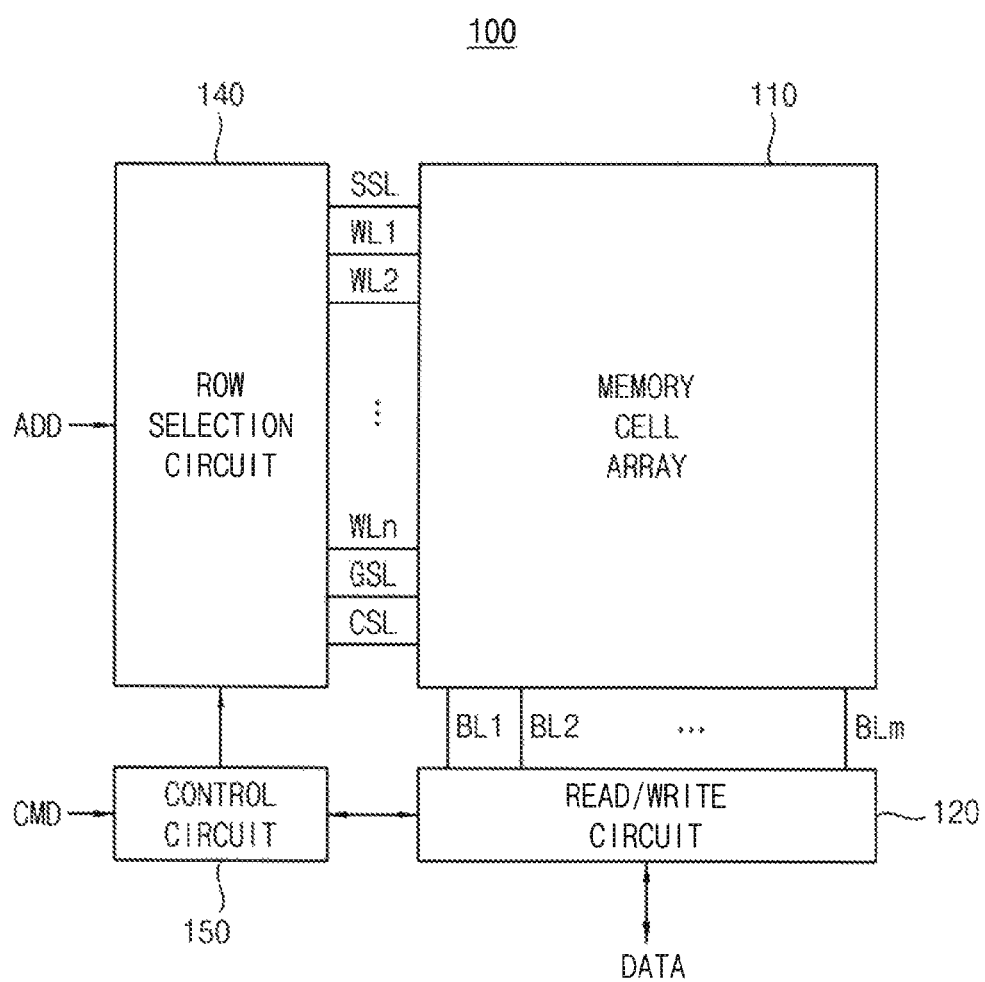
FIG. 12 is a block diagram illustrating a memory device included in the storage device in FIG. 11 according to example embodiments.
Figure 13A:
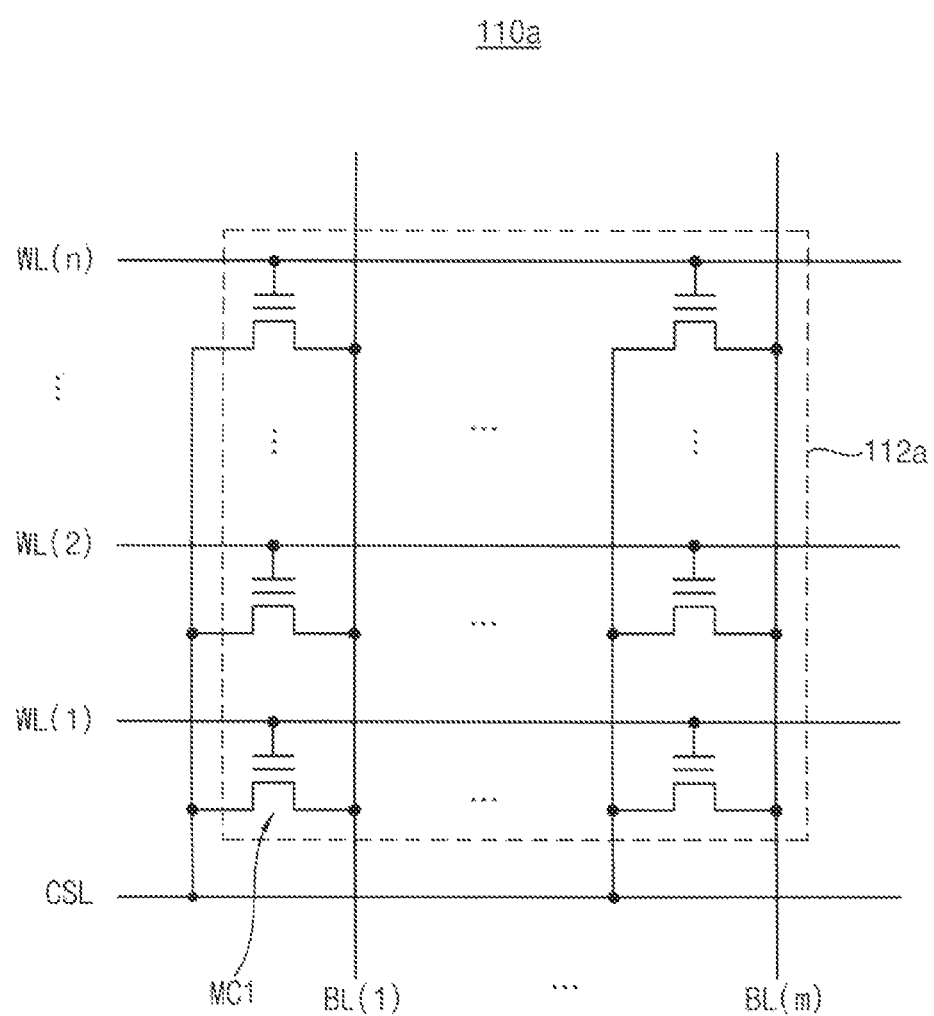
FIGS. 13A, 13B and 13C are diagrams illustrating examples of a memory cell array included in the memory device of FIG. 12.
Figure 13B:
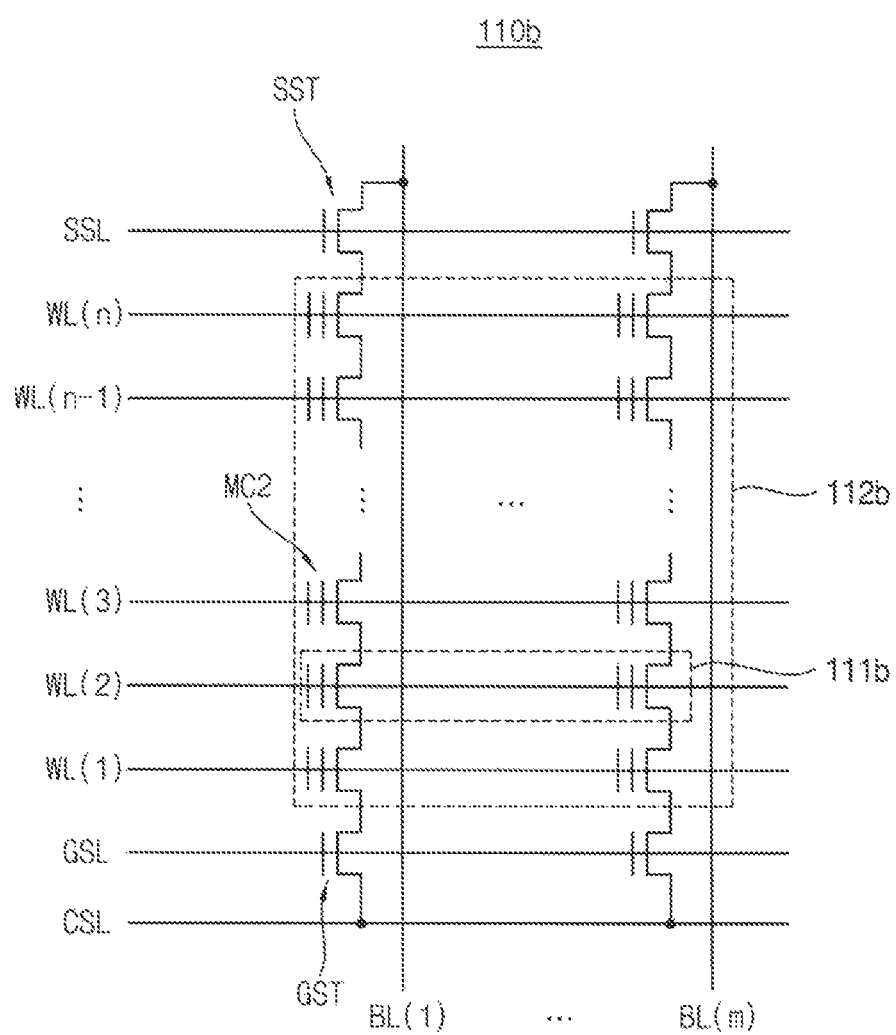
Figure 13C:
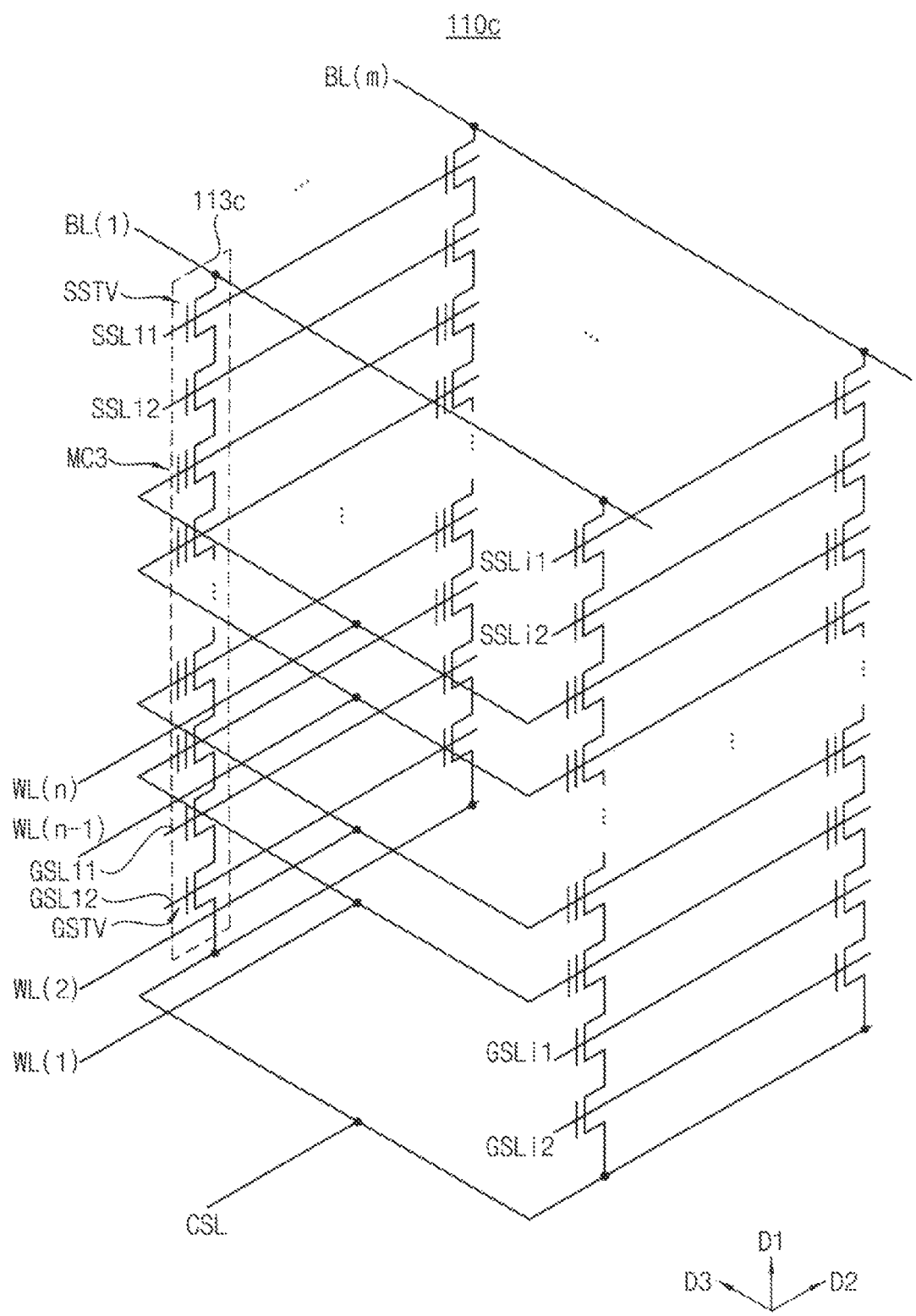

FIG. 12 is a block diagram illustrating a memory device included in the storage device in FIG. 11 according to example embodiments, and FIGS. 13A, 13B and 13C are diagrams illustrating examples of a memory cell array included in the memory device of FIG. 12.

For convenience of description, a NAND flash memory device is illustrated in FIGS. 12, 13A, 13B and 13C as an example of the memory device.

Referring to FIG. 12, the NAND flash memory device 100 may include a memory cell array 110, a read/write circuit 120, a row selection circuit 140 and a control circuit 150. The memory cell array 110 may include a plurality of memory cells. Each memory cell may store one-bit data or multi-bit data.

The memory cell storing one bit may be referred to as a single-level cell (SLC) and the memory cell storing multiple bits may be referred to as a multi-level cell (MLC). The memory cell array 110 may include a plurality of memory cells that are disposed at cross points of a plurality of rows or word lines and a plurality of columns or bit lines. The memory cells in the memory cell array 110 may form a plurality of memory blocks.

The control circuit 150 may control the overall operations associated with the write, read and erase operations of the NAND flash memory device 100. The data to be programmed may be loaded to the read/write circuit 120 under control of the control circuit 150. During the program operation, the control circuit 150 may control the row selection circuit 140 and the read/write circuit 120 so that a program voltage is applied to the selected word line, a program pass voltage is applied to the unselected word lines, and a bulk bias voltage (e.g., 0V) is applied to the bulk of the memory cells.

The program voltage may be generated according to incremental step pulse programming (ISPP). The level of the program voltage may be increased or decreased sequentially by a voltage interval as the program loops are repeated. The number of the program pulses, the voltage levels of the program pulses, the duration time of each program pulse, etc. may be determined by the control circuit 150 or by an external memory controller.

The control circuit 150 may generate the bulk voltage or the word line voltages, such as the program voltage, the pass voltage, the program verification voltage, the read voltage, etc. The row selection circuit 140 may select one memory block in the memory cell array 110 and one word line in the selected memory block, in response to the row address and the control signals from the control circuit 150. The row selection circuit 140 may provide the corresponding word line voltages to the selected word line and the unselected word lines in response to the control signals from the control circuit 150.

The read/write circuit 120 is controlled by the control circuit 150 to operate as a sense amplifier or a write driver depending on the operation mode. For example, the read/write circuit 120 may operate as a sense amplifier for reading out the data from the memory cell array 110 during a verification read operation or a normal read operation. The data output during a normal read operation may be provided to an external device, such as a memory controller or a host device, while the data output during a verification read operation may be provided to a pass/fail verification circuit (not shown).

In case of a write operation, the read/write circuit 120 may operate as the write driver for driving the bit lines based on the data to be written in the memory cell array 110. The read/write circuit 120 may receive the data from the external device and drive the bit lines based on the received data. The read/write circuit 120 may include a plurality of page buffers corresponding to a plurality of bit lines.

In programming the memory cells coupled to the selected word line, the program voltage and the program verification voltage may be applied alternatively to the selected word line. For the verification operation, the bit lines coupled to the selected memory cells may be precharged. The voltage change of the precharged bit line may be detected by the corresponding page buffer. The detected data during the verification read operation may be provided to the pass/fail verification circuit to determine whether the corresponding memory cell has been programmed successfully.

FIG. 13A is a circuit diagram illustrating a memory cell array included in a NOR flash memory device, FIG. 13B is a circuit diagram illustrating a memory cell array included in a NAND flash memory device, and FIG. 13C is a circuit diagram illustrating a memory cell array included in a vertical flash memory device.

Referring to FIG. 13A, a memory cell array 110a may include a plurality of memory cells MC1. Memory cells in the same column may be connected in parallel between one of bitlines BL(1), . . . , BL(m) and a common source line CSL. Memory cells in the same row may be commonly connected to the same wordline among wordlines WL(1), . . . , WL(n). For example, memory cells in a first column may be connected in parallel between a first bitline BL(1) and the common source line CSL. Memory cells in a first row may be commonly connected to a first wordline WL(1). The memory cells MC1 may be controlled by a voltage on the wordlines WL(1), . . . , WL(n).

In the NOR flash memory device including the memory cell array 110a, a read operation and a program operation may be performed per byte or word, and an erase operation may be performed per block 112a. In the program operation, a bulk voltage having a range of about −0.1 to −0.7 volts may be applied to a bulk substrate of the NOR flash memory device.

Referring to FIG. 13B, the memory cell array 110b may include string select transistors SST, ground select transistors GST and a plurality of memory cells MC2. The string select transistors SST may be connected to bitlines BL(1), . . . , BL(m), and the ground select transistors GST may be connected to a common source line CSL. The memory cells MC2 may be connected in series between the string select transistors SST and the ground select transistors GST. Memory cells in the same row may be connected to the same wordline among wordlines WL(1), . . . , WL(n). For example, 16, 32 or 64 wordlines may be disposed between a string select line SSL and a ground select line GSL.

The string select transistors SST may be connected to the string select line SSL, and may be controlled by a voltage on the string select line SSL. The ground select transistors GST may be connected to the ground select line GSL, and may be controlled by a voltage on the ground select line GSL. The memory cells MC2 may be controlled by a voltage on the wordlines WL(1), . . . , WL(n).

In the NAND flash memory device including the memory cell array 110b, a read operation and a program operation may be performed per page 111b, and an erase operation may be performed per block 112b. During the program operation, a bulk voltage having a level of about 0 volt may be applied to a bulk substrate of the NAND flash memory device. For example, each page buffer may be connected to an odd-numbered bitline and an even-numbered bitline. In this case, the odd-numbered bitlines may form odd-numbered pages, the even-numbered bitlines may form even-numbered pages, and program operations for the odd-numbered pages and the even-numbered pages may be alternately performed.

Referring to FIG. 13C, a memory cell array 110c may include a plurality of strings 113c each of which has a vertical structure. The strings 113c may be formed in a second direction D2 to define a string column, and a plurality of string columns may be formed in a third direction D3 to define a string array. Each string may include string select transistors SSTV, ground select transistors GSTV, and a plurality of memory cells MC3 that are formed in a first direction D1 and are connected in series between the string select transistors SSTV and the ground select transistors GSTV.

The string select transistors SSTV may be connected to bitlines BL(1), . . . , BL(m), and the ground select transistors GSTV may be connected to a common source line CSL. The string select transistors SSTV may be connected to string select lines SSL11, SSL12, . . . , SSLi1, SSLi2, and the ground select transistors GSTV may be connected to ground select lines GSL11, GSL12, . . . , GSLi1, GSLi2. The memory cells in the same layer may be connected to the same wordline among wordlines WL(1), WL(2), WL(n−1), WL(n). Each string select line and each ground select line may extend in the second direction D2, and the string select lines SSL11, SSLi2 and the ground select lines GSL11, GSLi2 may be arranged spaced apart from each other in the third direction D3. Each wordline may extend in the second direction D2, and the wordlines WL(1), . . . , WL(n) may be arranged spaced apart from each other in the first direction D1 and the third direction D3. Each bitline may extend in the third direction D3, and the bitlines BL(1), . . . , BL(m) may be arranged spaced apart from each other in the second direction D2. The memory cells MC3 may be controlled by a voltage on the wordlines WL(1), . . . , WL(n).

Similarly to the NAND flash memory device, in the vertical flash memory device including the memory cell array 110c, a read operation and a program operation may be performed per page, and an erase operation may be performed per block.

Although not illustrated in FIG. 13C, two string select transistors included in a single string may be connected to a single string select line, and two ground select transistors included in the single string may be connected to a single ground select line. According to example embodiments, the single string may include one string select transistor and one ground select transistor.

Figure 14:
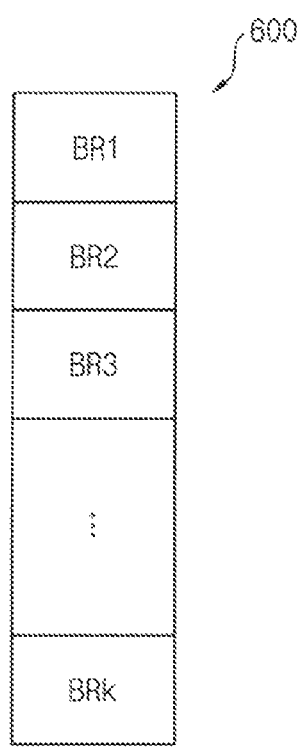
FIG. 14 is a diagram illustrating an example embodiment of dividing a mapping memory included in the nonvolatile memory system of FIG. 2.

FIG. 14 is a diagram illustrating an example embodiment of dividing a mapping memory included in the nonvolatile memory system of FIG. 2.

Referring to FIG. 14, a buffer memory 600 may be divided into a plurality of buffer regions BR1~BRk in which the user data are stored. The size of each of the buffer regions BR1~BRk may be identical to a size of a data unit that is transferred between the nonvolatile memory device and the memory controller. As a result, the size of the each of the mapping memory regions MMR1~MMRn of FIG. 3 and the size of each of the buffer regions BR1~BRk may be identical to the data unit. Through the unified memory management of the identical size, at least a portion of the mapping memory 500 may be used as the buffer memory, for example, a cache memory.

Figures 15A, 15B:
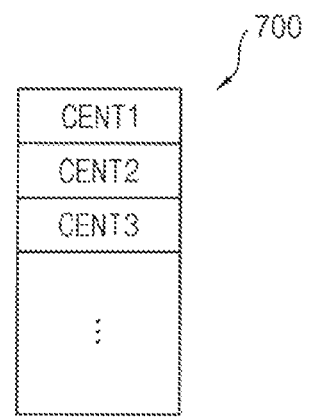
FIGS. 15A and 15B are diagrams illustrating example embodiments of a caching table used in a method of operating a nonvolatile memory system according to example embodiments.

FIGS. 15A and 15B are diagrams illustrating example embodiments of a caching table used in a method of operating the nonvolatile memory system according to example embodiments.

FIG. 15A illustrates a combined caching table 700 that stores caching information of user data stored in the buffer memory 600 and the mapping memory 500, where the buffer memory 600 and the mapping memory 500 are physically distinct from each other, and FIG. 15B illustrates an example of caching entry corresponding to the combined caching table 700.

In example embodiments, the buffer memory 600 may store the combined caching table 700. For example, some of buffer regions of the buffer memory 600 may store user data and some of buffer regions of the buffer memory 600 may store the combined caching table 700.

Referring to FIG. 15A, the combined caching table 700 may include a plurality of combined caching entries CEN1, CEN2 and CEN3 to store caching information corresponding to the user data that are stored in the data mapping memory regions DATA MMR of the mapping memory 500 or the buffer regions of the buffer memory 600. The number of the combined caching entries CEN1, CEN2 and CEN3 may be varied depending on the amount of the user data stored in the data mapping memory regions DATA MMR and the buffer regions.

Referring to FIG. 15B, each combined caching entry CENTi may include a memory identification field MB, a logical address LAi, an address of user data corresponding to the logical address LAi and other values ETC. The address of user data corresponding to the logical address LAi may be an address of a mapping memory region MRAi or an address of a buffer region BRAi. The memory identification field MB may have a first value when the address of user data is the address MRAi of the mapping memory region or a second value when the address of user data is the address BRAi of the buffer region. The other values may include a value representing validity of the combined caching entry CENTi, etc. The memory identification field MB may be omitted when the buffer memory 600 is omitted or combined with the mapping memory 500.

Figure 16A:
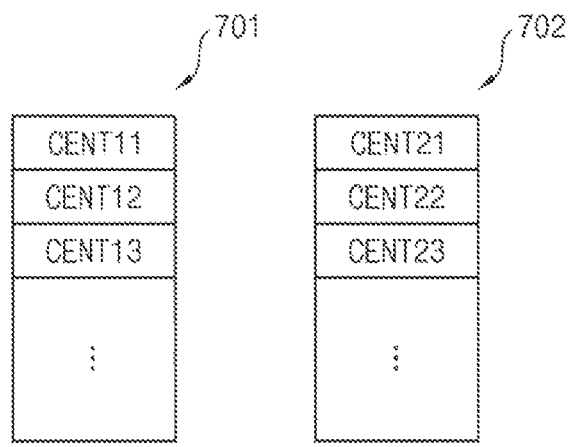
FIGS. 16A and 16B are diagrams illustrating other example embodiments of a caching table used in a method of operating a nonvolatile memory system according to example embodiments.
Figure 16B:
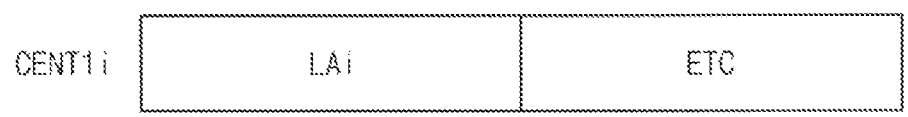
Figure 16B:
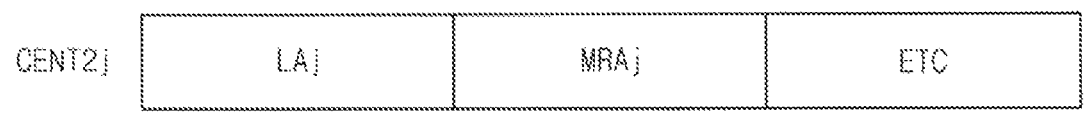

FIGS. 16A and 16B are diagrams illustrating other example embodiments of a caching table used in a method of operating the nonvolatile memory system according to example embodiments.

FIG. 16A illustrates a main caching table 701 that stores caching information of user data stored in the buffer memory 600 and a sub caching table 702 that stores caching information of user data stored in the mapping memory 500, where the buffer memory 600 and the mapping memory 500 may be physically distinct from each other, and FIG. 16B illustrates an example of caching entries corresponding to the main caching table 701 and the sub caching table 702.

Referring to FIG. 16A, the main caching table 701 may include a plurality of main caching entries CENT11, CENT12 and CENT13 to store caching information corresponding to the user data that are stored in the buffer region of the buffer memory 600 and the sub caching table 702 may include a plurality of sub caching entries CENT21, CENT22 and CENT23 to store caching information corresponding to the user data that are stored in the data mapping memory region DATA MMR of the mapping memory 500. The number of the main caching entries CEN11, CEN12 and CEN13 and the number of the sub caching entries CENT21, CENT22 and CENT23 may be varied depending on the amount of the user data stored in the buffer regions and the data mapping memory regions DATA MMR, respectively.

Referring to FIG. 16B, each main caching entry CENT1i in the main caching table 701 may include a logical address LAi corresponding to the user data stored in the buffer region and other values ETC. In this case, the index i itself of the main caching entry CENT1i may represent the address of the buffer region in which the user data corresponding to the logical address LAi are stored so that the address of the buffer region may be mapped to the logical address LAi. The address of the buffer region may be calculated using a start address of the buffer memory, an offset value corresponding to a size of one main caching entry, etc. The other values ETC may include a value indicating validity of each main caching entry CENT1i, etc. As another example, each main caching entry CENT1i in the main caching table 701 may include an address BRAi representing an address of the buffer region in which the user data are stored.

Each sub caching entry CENT2j in the sub caching table 702 may include an address MRAj representing an address of the data mapping memory region DATA MMR in which the user data are stored, a logical address LAj corresponding to the user data stored in the data mapping memory region DATA MMR and other values ETC. In this case, the logical address LA2j may be mapped to the address MRAj of the data mapping memory region DATA MMR. The other values ETC may include a value indicating validity of each sub caching entry CENT2j, etc.

The memory controller may use the buffer memory 600 as an L1 cache memory based on the main caching table 701 and the mapping memory as an L2 cache memory based on the sub caching table 702. In other words, the memory controller may search the main caching table 701 firstly and then search the sub caching table 702 only if the caching information corresponding to the logical address from the host device does not exist in the main caching table 701.

Figure 17:
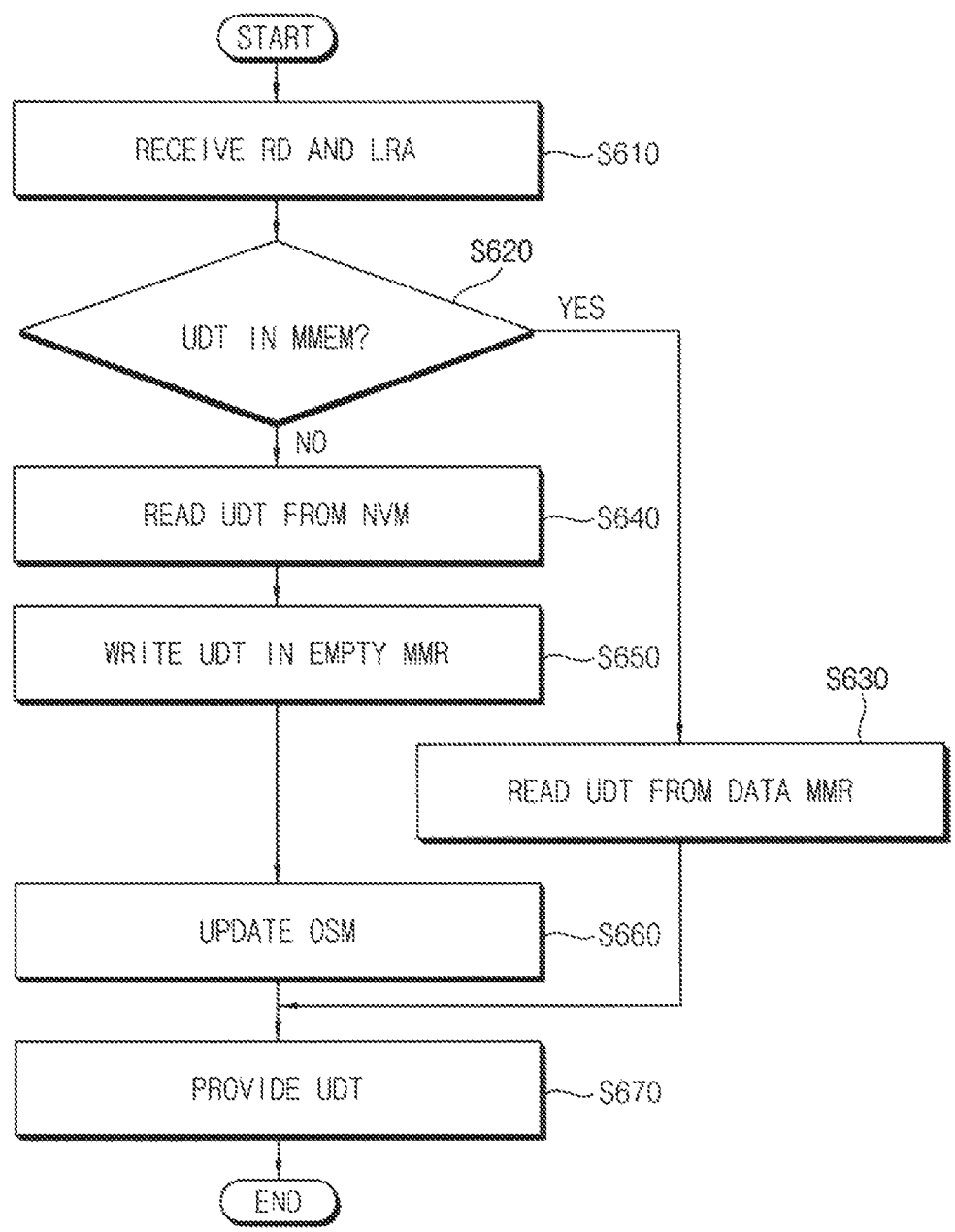
FIG. 17 is a flow chart illustrating a method of reading data in a nonvolatile memory system according to example embodiments.

FIG. 17 is a flow chart illustrating a method of reading data in the nonvolatile memory system according to example embodiments.

Referring to FIG. 17, for a read operation, the memory controller may receive a read command RD and a logical read address LRA from the host device (S610).

When user data corresponding to the logical read address LRA are not stored in the data mapping memory regions DATA MMR of the mapping memory MMEM (S620: NO), the memory controller reads the user data UDT corresponding to the logical read address LRA from the nonvolatile memory device (S640).

In example embodiments, the operation S640 may include the operations S520 through S580 of FIG. 10. For example, in the operation S580, the memory controller may provide the physical address PA corresponding to the logical read address LRA to the nonvolatile memory device so that the memory controller may read the user data UDT corresponding to the logical read address LRA from the nonvolatile memory device.

The mapping memory MMEM writes the read user data UDT in an empty mapping memory region EMPTY MMR (S650) and updates the value of the corresponding status indicating region of the occupation status manager OSM (S660), as described with reference to FIGS. 6 through 9. The memory controller provides the read user data UDT to the host device (S670).

When the user data corresponding to the logical read address LRA are stored in the data mapping memory region DATA MMR of the mapping memory MMEM (S620: YES), the memory controller does not need to access the nonvolatile memory device. The memory controller reads the user data from the data mapping memory region DATA MMR of the mapping memory MMEM and provides the read user data UDT to the host device (S670).

Figure 18:
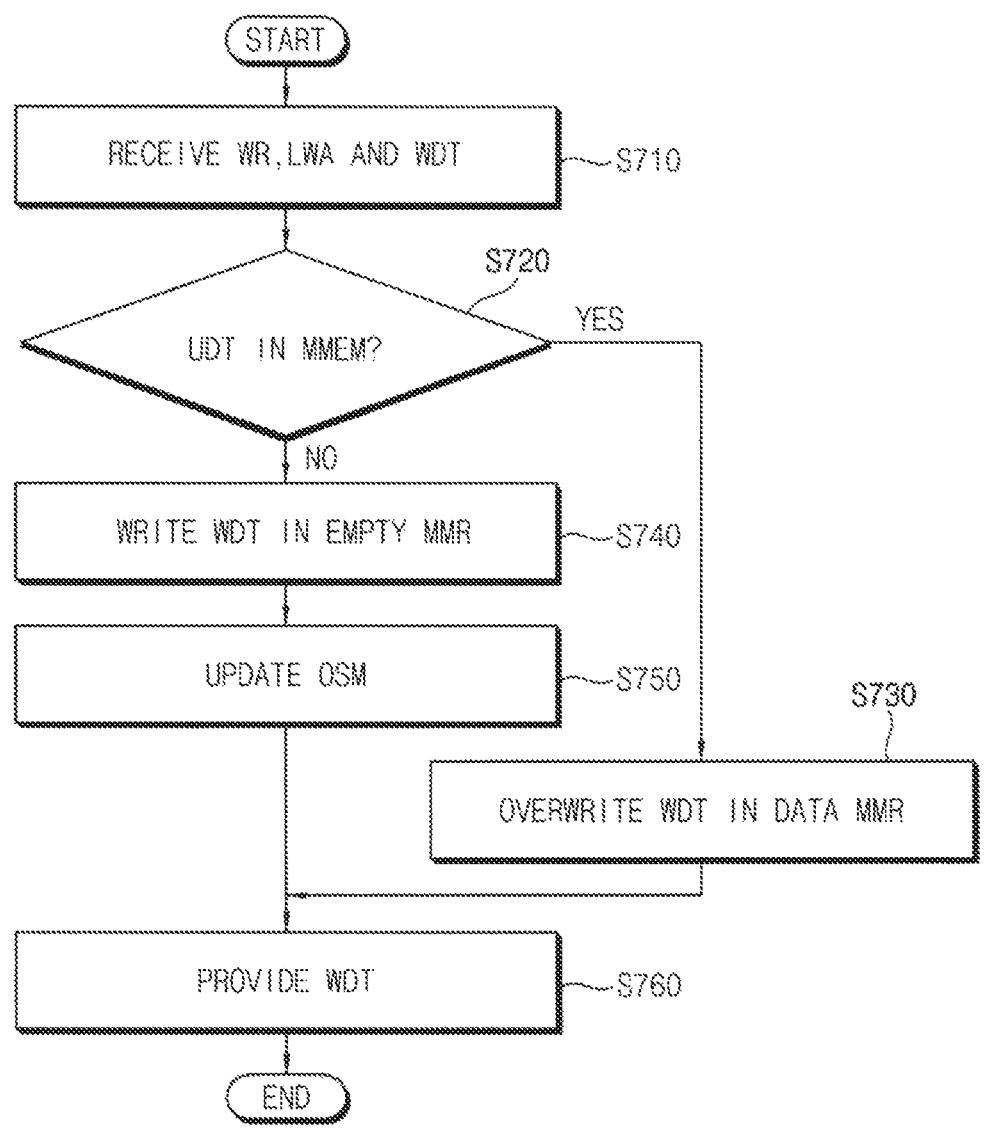
FIG. 18 is a flow chart illustrating a method of writing data in a nonvolatile memory system according to example embodiments.

FIG. 18 is a flow chart illustrating a method of writing data in the nonvolatile memory system according to example embodiments.

Referring to FIG. 18, for a write operation, the memory controller may receive a write command WR, a logical write address LWA and write data WDT from the host device (S710).

When user data UDT corresponding to the logical write address LWA are not stored in the data mapping memory regions DATA MMR of the mapping memory MMEM (S720: NO), the memory controller stores the write data WDT in an empty mapping memory region EMPTY MMR of the mapping memory MMEM (S740) as user data UDT and updates the value of the corresponding status indicating region of the occupation status manager OSM (S750), as described with reference to FIGS. 6 through 9. The memory controller provides the write data WDT to the nonvolatile memory device (S760).

When the user data UDT corresponding to the logical write address LWA are stored in the data mapping memory regions DATA MMR of the mapping memory MMEM (S720: YES), the memory controller overwrites the write data WDT in the data mapping memory region DATA MMR (S730) to replace the user data UDT stored therein, and provides the write data WDT to the nonvolatile memory device (S760).

In example embodiments, the operation S760 may include the operations S520 through S580 of FIG. 10. For example, in the operation S580, the memory controller may provide the physical address PA corresponding to the logical write address LWA to the nonvolatile memory device so that the memory controller may store the write data WDT corresponding to the logical write address LWA in the nonvolatile memory device.

As described with reference to FIGS. 10, 17 and 18, the values of the occupation status manager may be updated when the mapping data or the user data are stored in a new mapping memory region of the mapping memory. In addition, the values of the occupation status manager may be updated when the mapping data or the user data stored in the mapping memory are discarded or invalidated. Through such update of the values of the occupation status manager, the method of operating the nonvolatile memory system according to example embodiments may be performed efficiently.

Figure 19:
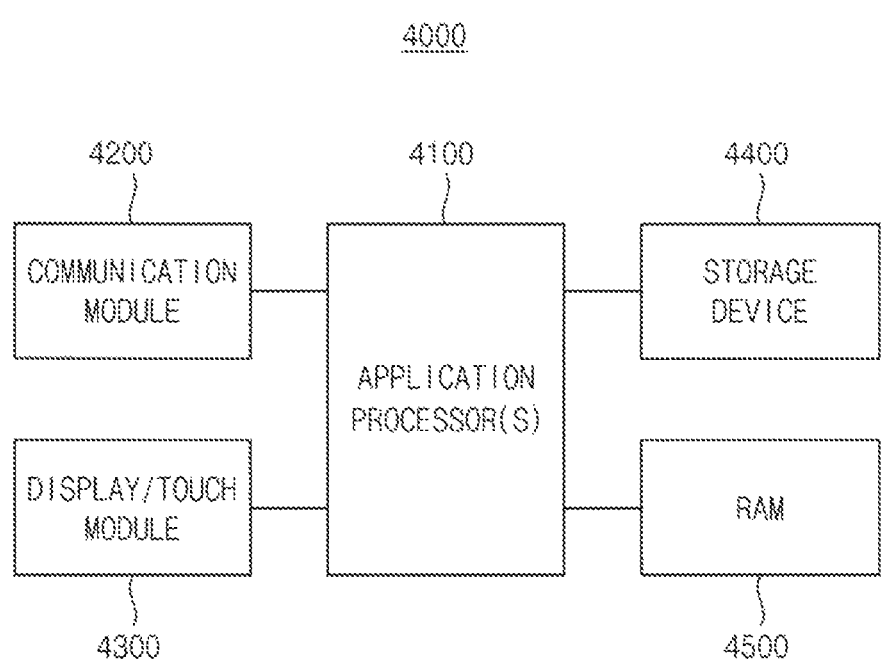
FIG. 19 is a block diagram illustrating a mobile device according to example embodiments.

FIG. 19 is a block diagram illustrating a mobile device according to example embodiments.

Referring to FIG. 19, a mobile device 4000 may include at least one application processor 4100, a communication module 4200, a display/touch module 4300, a storage device 4400, and a buffer RAM 4500.

The application processor 4100 controls operations of the mobile device 4000. The communication module 4200 is implemented to perform wireless or wire communications with an external device. The display/touch module 4300 is implemented to display data processed by the application processor 4100 and/or to receive data through a touch panel. The storage device 4400 is implemented to store user data. The storage device 4400 may be an embedded multimedia card (eMMC), a solid state drive (SSD, a universal flash storage (UFS) device, etc. The storage device 4400 may perform caching of the mapping data and the user data as described above.

The buffer RAM 4500 temporarily stores data used for processing operations of the mobile device 4000. For example, the buffer RAM 4500 may be volatile memory such as double data rate (DDR) synchronous dynamic random access memory (SDRAM), low power double data rate (LPDDR) SDRAM, graphics double data rate (GDDR) SDRAM, Rambus dynamic random access memory (RDRAM), etc.

As described above, the nonvolatile memory system and the method of operating the nonvolatile memory system according to example embodiments may enhance performance of the nonvolatile memory system without increase of circuit size by utilizing a portion of a mapping memory as a cache memory.

The present inventive concept may be applied to any electronic devices and systems. For example, the present inventive concept may be applied to systems such as be a memory card, a solid state drive (SSD), an embedded multimedia card (eMMC), a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

The foregoing is illustrative of example embodiments and is not to be construed as limiting thereof. Although a few example embodiments have been described, those skilled in the art will readily appreciate that many modifications are possible in the example embodiments without materially departing from the spirit and scope of the following claims.

What is claimed is:

1. A method of operating a nonvolatile memory system including a nonvolatile memory device and a memory controller connected to the nonvolatile memory device, the method comprising:
dividing a mapping memory included in the memory controller into a plurality of mapping memory regions, the mapping memory configured to store mapping data, the plurality of mapping memory regions being determined to store mapping data;
dividing a buffer memory included in the memory controller into a plurality of buffer regions, the buffer memory being physically distinct from the mapping memory;
storing first user data in at least one of the plurality of buffer regions of the buffer memory;
providing occupation information representing whether the mapping data are stored in each mapping memory region of the plurality of mapping memory regions; and
storing, based on the occupation information, second user data in a first mapping memory region of the plurality of mapping memory regions, wherein the first mapping memory region is a mapping memory region in which the mapping data are not stored,
wherein the mapping data represent a mapping relation between a logical address received from a host device and a physical address of the nonvolatile memory device.

2. The method of claim 1, wherein the providing of the occupation information includes:
providing an occupation status manager including a plurality of status indicating regions, the plurality of status indicating regions respectively corresponding to the plurality of mapping memory regions, each status indicating region of the plurality of status indicating regions storing a value representing whether a corresponding mapping memory region of the plurality of mapping memory regions is an occupied mapping memory region in which the mapping data are stored or an unoccupied mapping memory region in which the mapping data are not stored.

3. The method of claim 2, wherein the providing of the occupation status manager includes storing one or more bits in each status indicating region.

4. The method of claim 3, wherein a first value of the one or more bits represents that a corresponding mapping memory region is the occupied mapping memory region, and
wherein a second value of the one or more bits represents that a corresponding mapping memory region is the unoccupied mapping memory region.

5. The method of claim 4, wherein the providing of the occupation information further includes:
changing the value of each status indicating region from the second value to the first value when the mapping data are stored in the unoccupied mapping memory region; and changing the value of each status indicating region from the first value to the second value when the mapping data stored in the occupied mapping memory region are discarded.

6. The method of claim 3, wherein a first value of the one or more bits represents that a corresponding mapping memory region is the occupied mapping memory region,
wherein a second value of the one or more bits represents that a corresponding mapping memory region is a data mapping memory region in which the second user data are stored, and
wherein a third value of the one or more bits represents that a corresponding mapping memory region is an empty mapping memory region in which both of the mapping data and the second user data are not stored.

7. The method of claim 6, wherein the providing of the occupation information further includes:
changing the value of each status indicating region from the third value or the second value to the first value when the mapping data are stored in the empty mapping memory region or the data mapping memory region;
changing the value of each status indicating region from the first value to the third value when the mapping data stored in the occupied mapping memory region are discarded; and
changing the value of each status indicating region from the second value to the third value when the second user data stored in the data mapping memory region are discarded.

8. The method of claim 2, further comprising:
providing a caching table including a plurality of caching entries, each caching entry of the plurality of caching entries including an address representing the corresponding mapping memory region that is a data mapping memory region in which the second user data are stored and the logical address corresponding to the second user data stored in the data mapping memory region.

9. The method of claim 2, further comprising:
providing a main caching table including caching information of the first user data stored in the buffer memory; and
providing a sub caching table including caching information of the second user data stored in the mapping memory.

10. The method of claim 9, wherein the main caching table includes a plurality of main caching entries, each main caching entry of the plurality of main caching entries including the logical address corresponding to the first user data stored in the buffer memory, and
wherein the sub caching table includes a plurality of sub caching entries, each sub caching entry of the plurality of sub caching entries including an address representing the corresponding mapping memory region that is a data mapping memory region in which the second user data are stored and the logical address corresponding to the second user data stored in the data mapping memory region.

11. The method of claim 9, wherein the buffer memory is used as an L1 cache memory based on the main caching table and the mapping memory is used as an L2 cache memory based on the sub caching table.

12. The method of claim 2, further comprising:
providing a combined caching table including a plurality of combined caching entries, each combined caching entry of the plurality of combined caching entries including the logical address corresponding to the second user data stored in the corresponding mapping memory region that is a data mapping memory region or in a corresponding buffer region of the plurality of buffer regions.

13. The method of claim 2, further comprising:
receiving an access command and a logical access address from the host device;
reading the mapping data corresponding to the logical access address from the nonvolatile memory device when the mapping data corresponding to the logical access address are not stored in the occupied mapping memory region; and
updating the value of the status indicating region of the occupation status manager when the mapping data read from the nonvolatile memory device are stored in the unoccupied mapping memory region.

14. The method of claim 2, further comprising:
receiving a read command from the host device, the logical address being received as a logical read address;
reading third user data corresponding to the logical read address from the nonvolatile memory device when the second user data corresponding to the logical read address are not stored in the mapping memory; and
updating the value of the status indicating region of the occupation status manager when the third user data read from the nonvolatile memory device are stored in the unoccupied mapping memory region as the second user data.

15. The method of claim 2, further comprising:
receiving a write command, write data from the host device, the logical address being received as a logical write address; and
updating the value of the status indicating region of the occupation status manager when the write data are stored as the second user data in the unoccupied mapping memory region.

16. The method of claim 1, wherein a size of each mapping memory region is identical to a size of a data unit that is transferred between the nonvolatile memory device and the memory controller.

17. A nonvolatile memory system comprising:
a nonvolatile memory device; and
a memory controller connected to the nonvolatile memory device and including a mapping memory, a buffer memory, an occupation status manager, and a controller,
wherein the mapping memory is configured to store mapping data, the mapping memory being divided into a plurality of mapping memory regions configured to be determined to store mapping data,
wherein the buffer memory is configured to store first user data, the buffer memory being physically distinct from the mapping memory and divided into a plurality of buffer regions,
wherein the occupation status manager is configured to provide occupation information representing whether the mapping data are stored in each mapping memory region of the plurality of mapping memory regions,
wherein the controller is configured to store, based on the occupation information, second user data in a corresponding mapping memory region of the plurality of mapping memory regions in which the mapping data are not stored, and
wherein the mapping data represent a mapping relation between a logical address of a host device and a physical address of the nonvolatile memory device.

18. The nonvolatile memory system of claim 17, wherein the occupation status manager includes a plurality of status indicating regions, the plurality of status indicating regions respectively corresponding to the plurality of mapping memory regions, each status indicating region of the plurality of status indicating regions storing a value representing whether a corresponding mapping memory region of the plurality of mapping memory regions is an occupied mapping memory region in which the mapping data are stored or an unoccupied mapping memory region in which the mapping data are not stored.

19. A nonvolatile memory system comprising:
   a nonvolatile memory device; and
   a memory controller connected to the nonvolatile memory device and including a mapping memory, a buffer memory, an occupation status manager, and a controller,
   wherein the mapping memory is configured to store mapping data, the mapping memory being divided into a plurality of mapping memory regions configured to be determined to store mapping data,
   wherein the buffer memory is configured to store first user data, the buffer memory being physically distinct from the mapping memory and divided into a plurality of buffer regions,
   wherein the occupation status manager is configured to provide occupation information representing whether the mapping data are stored in each mapping memory region of the plurality of mapping memory regions,
   wherein the controller is configured to store, based on the occupation information, second user data in a corresponding mapping memory region of the plurality of mapping memory regions in which the mapping data are not stored, and
   wherein the mapping data represent a mapping relation between a logical address of a host device and a physical address of the nonvolatile memory device.

* * * * *